United States Patent
de Boer et al.

(10) Patent No.: US 7,107,577 B2
(45) Date of Patent: Sep. 12, 2006

(54) SOFTWARE ARCHITECTURE FOR CONTROLLING AN APPARATUS WITH ONE OR MORE HARDWARE UNITS

(75) Inventors: Fokke de Boer, Enschede (NL); Henrik Ronkainen, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 651 days.

(21) Appl. No.: 10/300,005

(22) Filed: Nov. 20, 2002

(65) Prior Publication Data

US 2004/0098138 A1    May 20, 2004

(51) Int. Cl.
*G06F 9/44* (2006.01)

(52) U.S. Cl. ........................ 717/121; 717/120; 709/223

(58) Field of Classification Search ............ 716/16; 703/23; 714/3; 700/20; 370/337
See application file for complete search history.

(56) References Cited

U.S. PATENT DOCUMENTS

| | | | |
|---|---|---|---|
| 3,891,974 A * | 6/1975 | Coulter et al. .............. 703/23 |
| 5,539,661 A | 7/1996 | Nordenstam | |
| 6,742,173 B1 * | 5/2004 | Spivey ..................... 716/16 |
| 2003/0065970 A1 * | 4/2003 | Kadam ........................ 714/3 |
| 2005/0154475 A1 * | 7/2005 | Forchert et al. ............ 700/20 |
| 2005/0201340 A1 * | 9/2005 | Wang et al. ............... 370/337 |

FOREIGN PATENT DOCUMENTS

| | | |
|---|---|---|
| WO | WO 99 16270 | 4/1999 |
| WO | WO 99 37099 | 12/1999 |
| WO | WO 01 54300 | 7/2001 |
| WO | WO 01 84872 | 11/2001 |

OTHER PUBLICATIONS

International Search Report dated Apr. 20, 2004.

* cited by examiner

Primary Examiner—Kakali Chaki
Assistant Examiner—Mark P. Francis
(74) Attorney, Agent, or Firm—Nixon & Vanderhye P.C.

(57) ABSTRACT

A software architecture is used to control an apparatus with one or more hardware units that each perform one or more corresponding functions. The software architecture includes a device group data structure for each hardware unit and one or more device data structures for each hardware unit function. In a preferred, but an example embodiment, one or more device set data structures are defined in the software architecture. Each device set data structure is associated with the device group and includes one or more device data structures. The data structures defined in the software architecture are used to control the apparatus functionality physically performed by the hardware units.

33 Claims, 7 Drawing Sheets

SOFTWARE ARCHITECTURE FOR CONTROLLING AN APPARATUS WITH ONE OR MORE HARDWARE UNITS

FIELD OF THE INVENTION

The present invention relates to computer control of an apparatus with one or more hardware units using a software architecture which performs that control independently of the actual implementation of the hardware unit functionality.

BACKGROUND

Many types of apparatus are constructed using modular components that perform certain apparatus functions. Each module may be viewed as a hardware unit that is responsible for performing one or more functions. The functions to be performed by each hardware unit can vary from minor to complex.

An example of such an apparatus is a radio base station used in, for example, a radio telecommunication system. FIG. 1 shows a simplified radio communication system 10 including a radio network controller 12 coupled to plural base stations 14a and 14b. The radio network controller 12 is typically coupled to other networks such as circuit-switched and packet-switched networks. In this example, both base stations are "macro" base stations meaning that all of the hardware units used to perform each base station's functions are located in one physical location. Base station 14a includes a number of replaceable hardware units that contain electrical and/or electronic circuitry, components, power supplies, software, etc. Example base station hardware units include: one or two timing unit boards 16, one or two base band transmit boards 18, one or more random access/receive boards 20, one or more transceiver boards 22, one or two radio frequency interface boards 24, one or more antenna interface boards 26, one or more multi-carrier power amplifier boards 28, a power control board, and a controller board 32 responsible for controlling the base station in general and each of the function boards 16–30. In operation, the base station 14a effects radio communication with one or more mobile stations 34.

Accordingly, base station 14a is an example of a modular apparatus equipped with various types of hardware units that perform different functionalities. Different types of base stations from the same base station family often support the same functionality, although different members of the base station family may use different hardware units to implement that functionality. For example, as electronic and integrated circuit manufacturing and miniaturization techniques advance, more functionality will likely be integrated into a single hardware unit. In the base station 14a shown in FIG. 1, it may be desirable to combine the baseband transmit board 18 and the random access/receive board 20 into a single board. Alternatively, it may be desirable to modify an individual board or the board configuration. For example, it may be desirable to add additional transceiver boards 22 to increase the capacity of the base station 14a. Another possibility is that the processing capacity of a random access/receive board 20 is increased, which can either be used to increase the capacity of the base station or to provide the same capacity with fewer random access/receive boards. Indeed, one may foresee that each board shown in base station 14a may require modification or elimination in the integration example explained above.

As base station technology evolves, new base station configurations and functionality will be produced. An example of a new base station configuration is a main-remote base station configuration where the main unit includes hardware units that perform baseband functions for the base station and a physically remote unit performs radio functions for the base station. At the same time, older base station configurations should still be supported. In other words, a radio communications system may well contain both old and new base station equipment that needs to be integrated.

It is an object of the present invention to provide a mechanism that supports and controls a wide range of hardware units without being tied to the implementation details of each hardware unit.

It is an object of the present invention to provide a mechanism that readily and flexibly accommodates changes to individual hardware units, changes to configuration of the hardware units, and changes to the functionality that needs to be performed.

It is an object of the present invention to provide a mechanism that supports integrating functions previously performed by multiple hardware units into a single hardware unit.

It is an object of the present invention to provide a mechanism that supports different (e.g., increased) capacities of hardware units of the same type.

It is an object of the present invention to provide a mechanism that supports integrating new functionality into the apparatus.

It is an object of the present invention to provide a mechanism that permits a standardized approach for handling all the hardware units in the apparatus.

The present invention addresses and meets these and other objectives. A software architecture is used to control an apparatus with one or more hardware units that each perform one or more corresponding functions. The software architecture includes a device group data structure for each hardware unit and one or more device data structures for each hardware unit function. In a preferred, but an example embodiment, one or more device set data structures are defined in the software architecture. Each device set data structure represents one or more device data structures. The data structures defined in the software architecture are used to control the apparatus functionality physically performed by the hardware units.

The software architecture is independent of the specific hardware unit actually implementing a function and of how the hardware unit actually performs the function. For example, the device data structure is independent from the hardware unit responsible for actually implementing the device function. As a result, an identity, configuration, or implementation of a hardware unit may be changed without having to change the associated device data structure. To achieve this independence, the hardware unit stores a "mapping" between each function it is responsible for performing and the device data structure corresponding to that function.

Each device group data structure is associated with device data structures of a certain type in one hardware unit and device set data structures if employed. A device set data structure can be introduced to manage a set of individual device data structures. For purposes of illustration only, it is assumed that one or more device set data structures are employed. A device group can be associated with both different types of device set data structures and multiple instances of the same device set data structure. Each device group data structure is used by a software architecture manager to bring each device set associated with that device group into service and coordinate each device set with the device group. The device group manages the device set, and the device set in turn manages the individual devices associated with that device set. If a hardware unit is changed to support a different function, the hardware unit is associated with a new device group.

The software architecture manager manages the hardware units and the apparatus using the device group, device set, and device data structures in the software architecture. In addition, a device group software interface is defined for each device group, and a device set software interface is defined for each device set/device. These software interfaces define how the software architecture manager communicates with and manages the hardware units using the software architecture and include common procedures and signalling formats.

One of the advantages of the present invention is that functionality implemented by plural hardware units may be readily and flexibly integrated into a single, new hardware unit simply by defining a new device group data structure for the new hardware unit. That new device group data structure includes the device set and device data structures already established and associated with the "old" hardware units. Although a new device group software interface is defined, the device set/device software interface already defined for the device set/devices associated with the "old" hardware units are employed for the new, integrated configuration.

A non-limiting, example application of the present invention is to radio base stations. In this context, the manager uses the software architecture to start up and control the base station hardware units. The manager may also use the software architecture to flexibly expand the capacity of one or more of the base station hardware units simply by increasing the number of device data structures associated with a corresponding device set or device data structure. Moreover, the software architecture may be used to enhance one or more capabilities associated with one or more devices in the radio base station. Still further, the software architecture may be used to reconfigure a macro base station as a main-remote base station or a hybrid macro/main-remote base station.

BRIEF DESCRIPTION OF THE DRAWINGS

The foregoing and other objects, features, and advantages of the present invention may be more readily understood with reference to the following description taken in conjunction with the accompanying drawings.

DETAILED DESCRIPTION

In the following description, for purposes of explanation and not limitation, specific details are set forth, such as particular embodiments, examples, procedures, techniques, etc. in order to provide a thorough understanding of the present invention. However, it will be apparent to one skilled in the art that the present invention may be practiced in other embodiments that depart from these specific details. For example, while the present invention is described in one non-limiting embodiment as applied to a radio base station in a radio communication system, the present invention may be used in any equipment that includes multiple hardware units.

In some instances, detailed descriptions of well-known methods, interfaces, devices, and signaling techniques are omitted so as not to obscure the description of the present invention with unnecessary detail. Moreover, individual function blocks are shown in some of the figures. Those skilled in the art will appreciate that the functions may be implemented using individual hardware circuits, using software functioning in conjunction with a suitably programmed digital microprocessor or general purpose computer, using application specific integrated circuits (ASIC's), and/or using one or more digital signal processors (DSPs).

Figure 2:
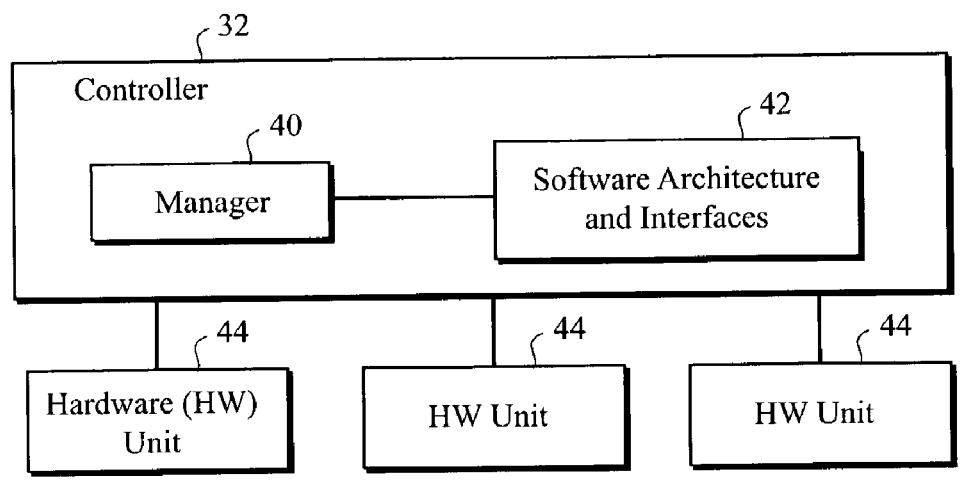
FIG. 2 is a function block diagram illustrating the principles of the present invention.

The present invention seeks to provide a software architecture that permits flexible management and control of equipment or other apparatus that relies on modular hardware units to perform various functions for that equipment/apparatus. Such flexibility permits easy expansion, modification, and integration of the equipment. The function block diagram shown in FIG. 2 illustrates an apparatus controller 32 coupled to a plurality of hardware units 44. The controller includes a software manager 40 coupled to a software architecture and to software architecture interfaces 42. Both the manager 40 and the software architecture and interfaces 42 are implemented using appropriate software programs and data structures processed and stored using conventional data processing and data storage circuitry. A hardware unit is a physical, replaceable entity such as a board or a specific unit that is part of the apparatus equipment and supports/performs some function of the apparatus. Hardware units can be located in one physical location, e.g., a cabinet of boards or racks, or they can be physically separated and even physically remote. The manager 40 controls the hardware units 44 operation using the software architecture and software architecture interfaces 42.

The software architecture 42 defines a framework that logically represents the functionality to be performed by the hardware units 44. The software architecture is supported by the manager 40 and by each hardware unit 44. From the manager's perspective, the software architecture 42 defines how the manager addresses each hardware unit and controls its operation. The software architecture includes software interfaces supported by both the manager 40 and each of the hardware units 44.

The software architecture 42 insulates the manager 40 from the actual implementation details of the hardware units 44. The software architecture and interfaces 42 also create uniformity in dealing with different types/kinds of hardware units. They also permit easy and flexible adaptation to different hardware unit configurations that may change/evolve over time.

The software architecture models functionality on two levels: the hardware unit level and the functionality level. Referring now to the function block diagram of the software architecture 42 shown in FIG. 3. The hardware unit level is represented by the software abstraction or data structure termed the "device group." There is a one-to-one correspondence between each hardware unit and a device group data structure. The functionality level is represented by the software abstraction or data structure "device." The device is a logical abstraction/data structure of some processing function. A function can be defined as one or more inputs resulting in a well-defined output(s). Because multiple devices may perform the same type of function, it is also desirable (although not required) to have an intervening software abstraction/data structure in the data software architecture referred to as a "device set". The device set data structure represents one or more devices of a certain type for one hardware unit. Certain characteristics, functions, and/or configurations may be common to all devices of a specific type. This commonality is handled by the device set data structure. Each of these software architecture data structures has one or more specific instantiations that represent actual, physical hardware units or functionalities. However, only device groups directly map to a hardware unit; device set and device are logical abstractions.

Figure 1:
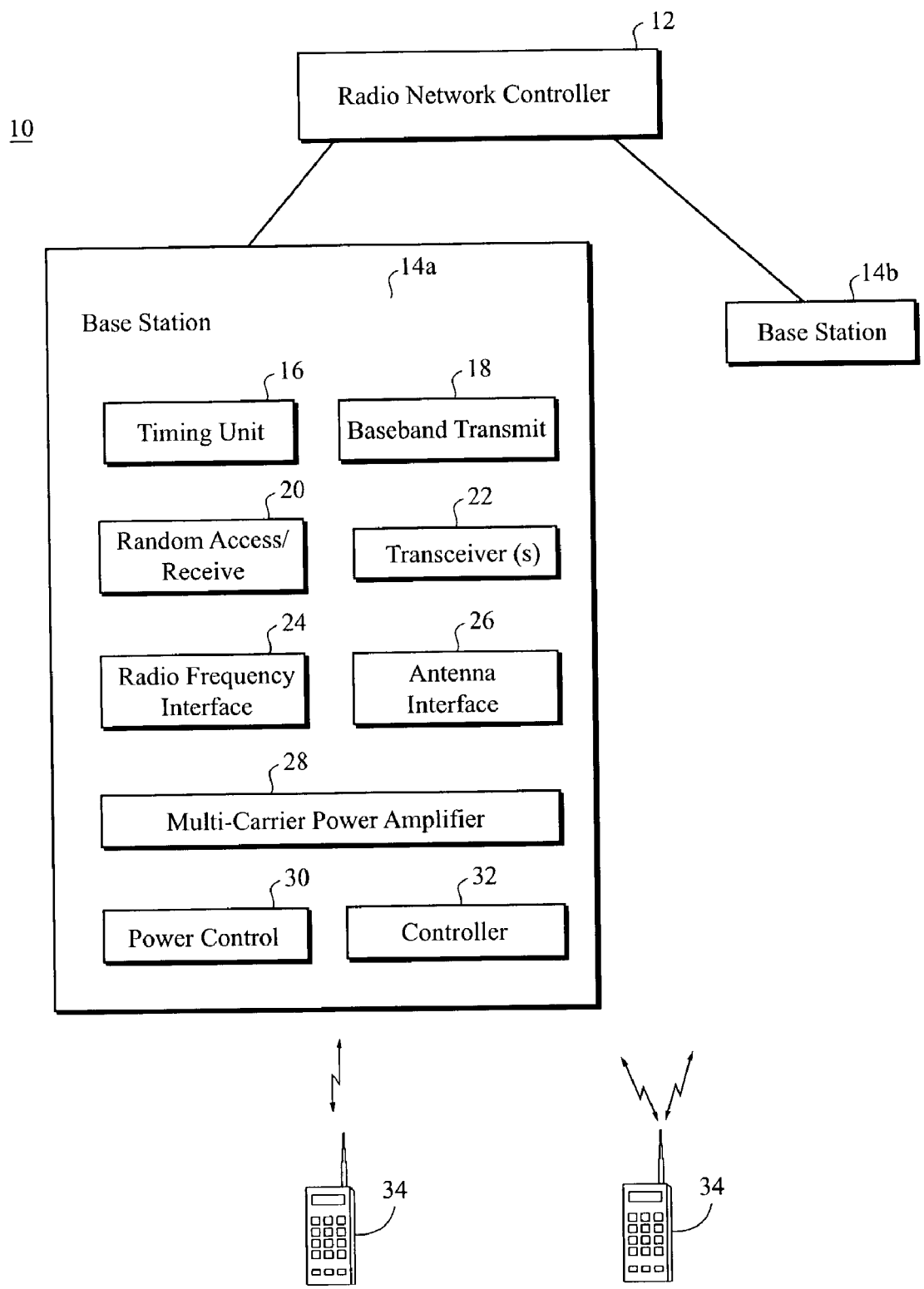
FIG. 1 illustrates a macro base station in a radio communication system.

Consider the following non-limiting example using the base station illustrated in FIG. 1. A device group might correspond to the multi-carrier power amplifier (MCPA) board, which corresponds to a hardware unit. The device set might correspond to the transmit power amplifier board, which is part of that MCPA hardware unit. A device might correspond to a specific transmit power amplifier on the transmit power amplifier board. Each of the device group, device set, and device data structures includes a corresponding software interface, a set of associated data attributes, and control functionality.

Figure 3:
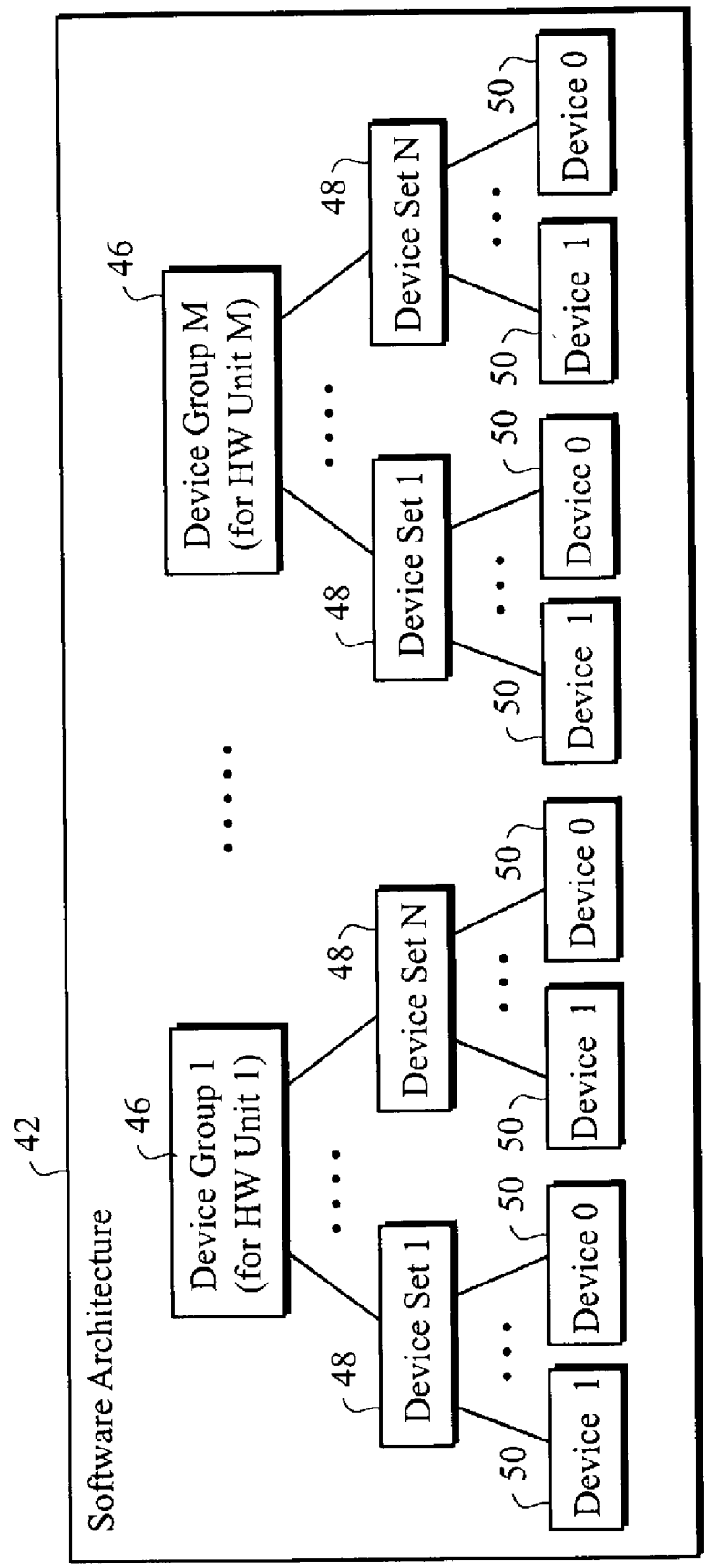
FIG. 3 is a function block diagram illustrating one example of a software architecture.

A representation of the software architecture 42 is shown in function block form in FIG. 3. M device groups 46 are shown for M hardware units, where M is a positive, non-zero integer. Each device group may differ from the other device groups. From the manager's point of view, the device group is the functional representation of a hardware unit. Each device group 46 contains one or more device sets 48. N device sets are shown, for purposes of illustration only, where N is a positive, non-zero integer. Each device set may differ from the other device sets. The device group brings its device set(s) into service and coordinates the device set(s) within the device group. Because there is a one-to-one relationship between a hardware unit and a device group instance, if a hardware unit supports a different functionality, a new device group is associated with that hardware unit.

Each device set 48 includes one or more devices 50. P devices are shown under each device set for purposes of illustration only, where P is a positive, non-zero integer. As explained earlier, a device is a logical abstraction/data structure of some processing function. Although each device is controlled and supervised by the manager 40, from the manager's point of view, it does not care how the device is implemented. In other words, the device data structure does not depend on how the device function is implemented in the hardware unit. Although it may be possible to identify a single chip or board on a hardware unit as the place where the device processing occurs, the processing may just as well be spread out over various ASIC's on that hardware unit.

The device abstraction/data structure allows for changes in the hardware unit implementation without having to change the manager 40. Hardware unit 44 is responsible for mapping the device data structure to the actual implementation/realization of the device's processing function.

In situations where there are typical multiple devices of the same type, it is useful to have a device set data structure/abstraction in the software architecture 42. A device set is particularly desirable for moving a device function to any hardware unit where the device functionality is performed. The device set data structure is used to represent one or more devices of a certain type for one hardware unit. Certain characteristics, functions, and/or configurations that are common to these devices are handled by the device set data structure 48.

Figure 4:
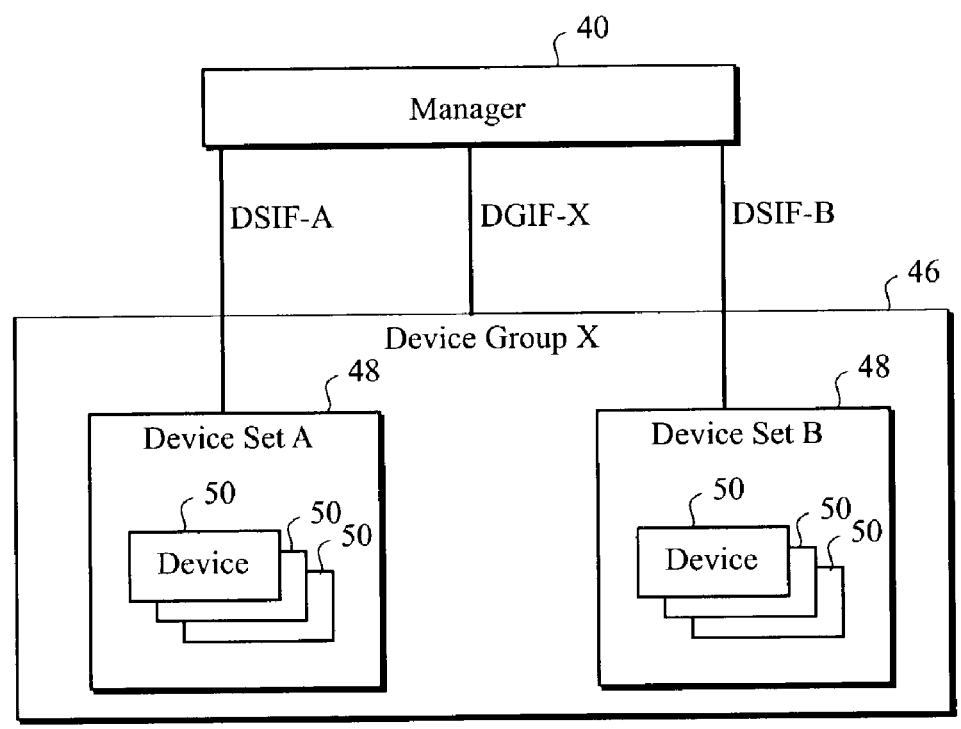
FIG. 4 is a diagram illustrating software interfaces between a software manager and a hardware unit according the software architecture.

The device group has its own software architecture interface. Similarly, a device set and its device(s) have their own software architecture interface. FIG. 4 illustrates these interfaces between the manager 40, a device group X 46 and device sets A and B 48. The manager and the device group X communicate using a Device Group Interface-X (DGIF-X). The two device sets 48A and 48B and their respective devices 50 communicate with the manager 40 using their respective Device Set Interfaces DSIF-A and DSIF-B, respectively. These interfaces are (preferably) standardized to provide and/or enforce a common way of control, but may also employ specific extensions. In FIG. 4, those extensions are represented as -X, -A, and -B.

Figure 5:
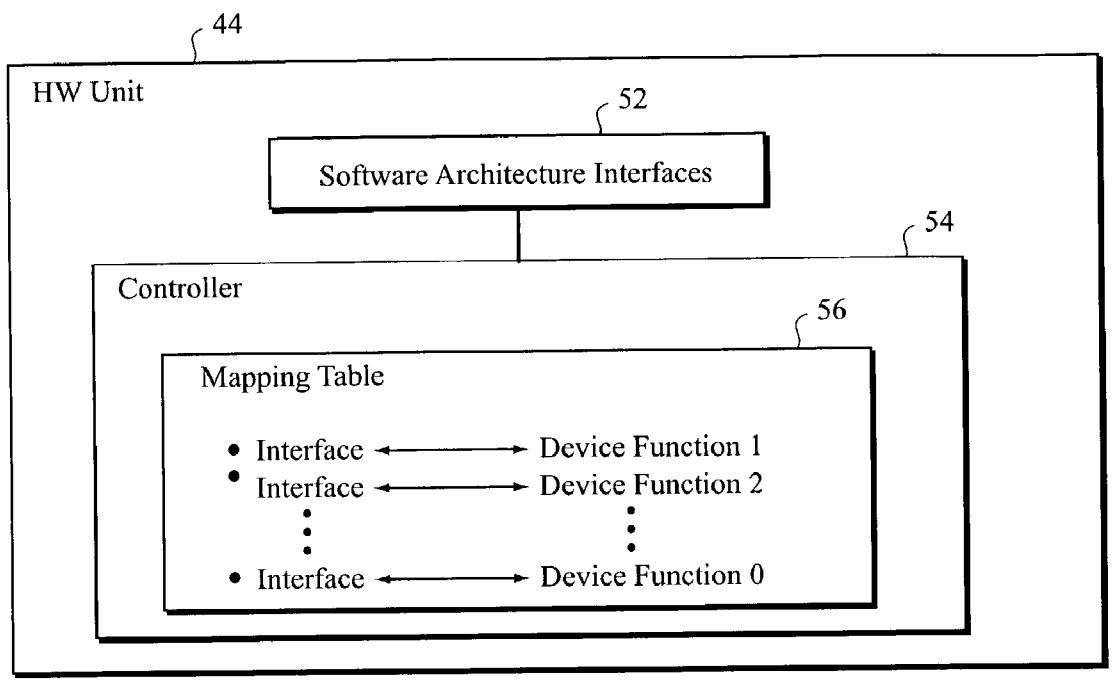
FIG. 5 illustrates in function block form software architecture interfaces and device function mappings included in each hardware unit.

The software architecture 42 is how the manager 40 "sees" the functionality supported by the hardware units. To make the manager 40 independent from a specific hardware realization, the hardware units must adhere to the data structures in the software architecture and must support the software interfaces 52. The hardware unit maps a particular data structure in the software architecture 42 to the physical implementation. As shown in FIG. 5, each hardware unit 44 includes a controller coupled to the software architecture interface support 52. The controller 54 includes a software mapping table 56 which maps each procedure from the software architecture interfaces 52 to an executable function on the hardware unit. Although a mapping table is shown, one need not be used if the hardware unit uses some other mechanism to perform the mapping. Similar mapping is performed for the device group and device set data structures.

Figure 6:
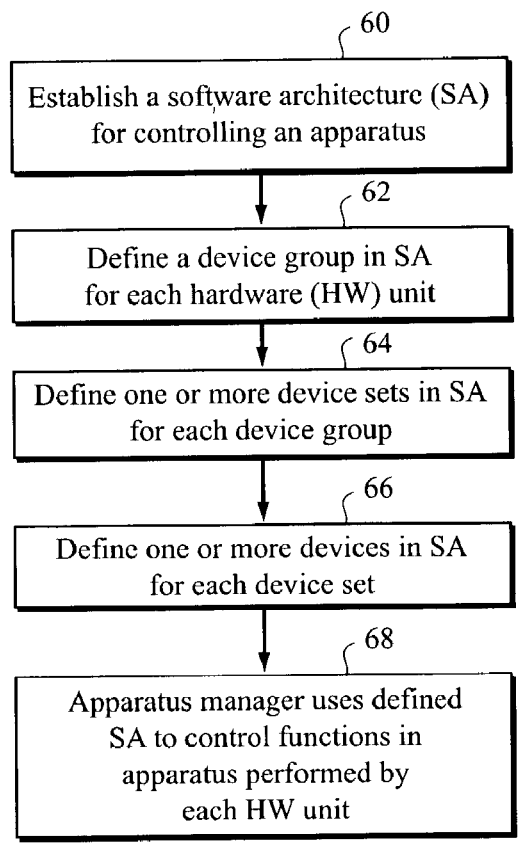
FIG. 6 is a flowchart diagram illustrating example procedures in accordance with one example embodiment of the invention.

FIG. 6 outlines general procedures in accordance with one example embodiment of the present invention. A software architecture is established for controlling an apparatus (block 60). A device group is defined in the software architecture for each type of hardware unit (block 62). There can be multiple instances of the same device group within an apparatus. One or more device sets are defined in the software architecture for each device group if employed (block 64). One or more devices are defined in the software architecture for each instance of a processing function (block 66). The apparatus manager uses the defined software architecture and the appropriate software interfaces to control functions performed by each hardware unit (block 66). The apparatus manager also uses the defined software architecture and software interfaces to flexibly accommodate changes in hardware unit capability, the number of hardware units, and other changes.

Using the software architecture and interfaces, functionality originally realized using more than one "old" hardware unit can be readily integrated into one "new" hardware unit. To perform this integration, a new device group is defined including a new device group interface. The device sets from the old hardware units are combined in this new device group and keep their already-defined device set interfaces.

Figure 7:
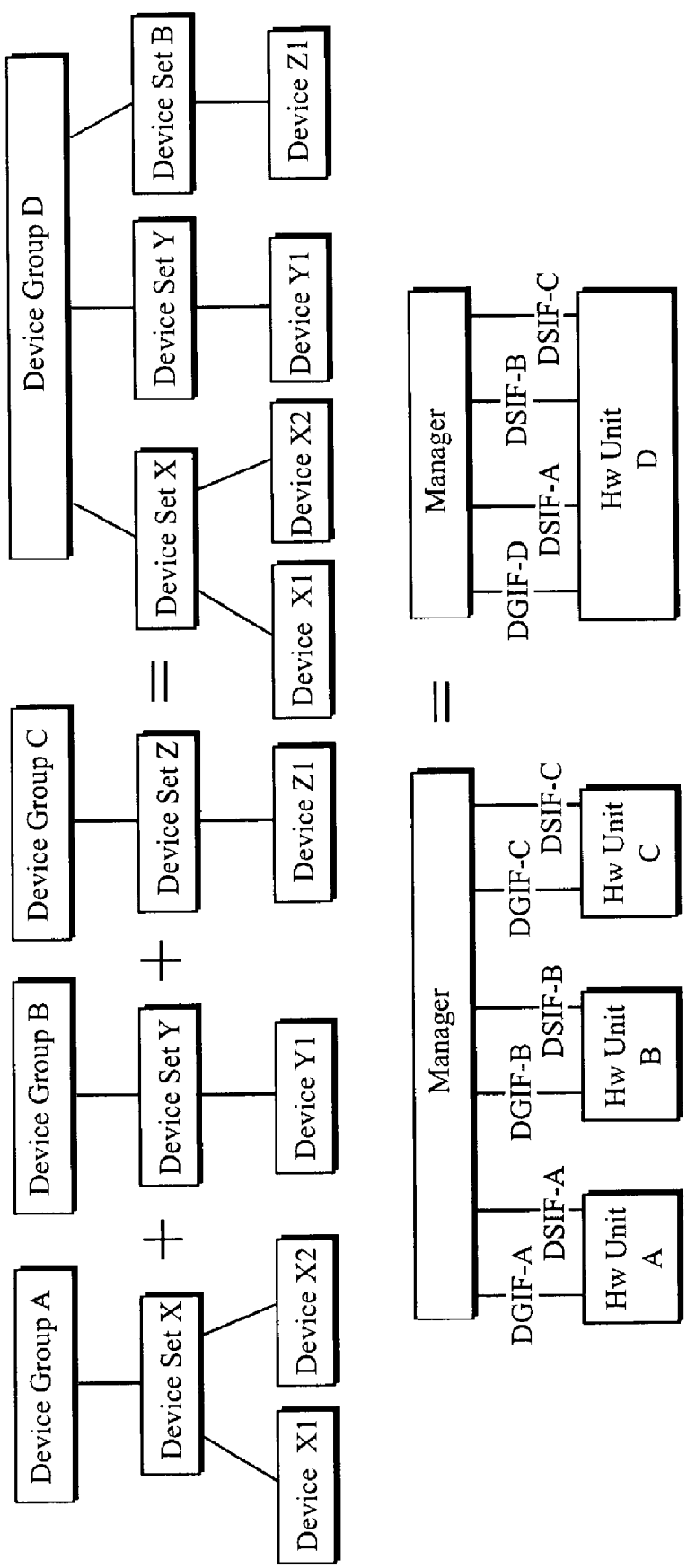
FIG. 7 illustrates a hardware unit integration example in which the present invention is employed.

FIG. 7 illustrates a general integration example where three hardware units are integrated into a single unit. Specifically, three device groups A, B, and C corresponding to three hardware units, respectively, are combined (represented by the plus symbols) into a single new hardware unit. The resulting integration or combination is a new device group D corresponding to the new hardware unit that includes the old device set A with its two devices A1 and A2, old device set B with its device B1, and old device set C with its device C1. As shown in FIG. 7, the manager communicates with each of the hardware units A, B, and C using corresponding Device Group Interfaces A, B, and C, and corresponding Device Set Interfaces X, Y, and Z, respectively. When the hardware units A, B, and C are combined in the "new" hardware unit D, the manager communicates with the hardware unit D using the "old" device set interfaces X, Y, and Z. Only a new device group interface D needs to be defined. In this way, the manager requires little change/reconfiguration to accommodate this integration; it only has to support the new device group interface. That the new hardware unit may have a completely different implementation from any of the old hardware units A, B, and C presents no problem as long as the new hardware unit D supports the appropriate software interfaces.

The following gives a detailed example for the existing HW Units, associated Device Groups, and contained Device Sets and Devices before integration.

| HW Unit | Device Group | Device Set |
| --- | --- | --- |
| Timing Unit Board | TU | TIM: Timing |
| Baseband Transmit Board | TX | DBCC: Downlink Baseband CellCarrier |
| | | DBCH: Downlink Baseband Channel |
| Random Access and Receive Board | RAX | UBCH: Uplink Baseband Channel |
| Tranceiver Board | TRX | TR: Transmit/Receive |
| Radio Frequency Interface Board | RFIF | DPCL: Dpwnlink Power Clipping |
| Antenna Interface Unit Board | AIU | AI: Antenna Interface |
| Multi-Carrier Power Amplifier | MCPA | TPA: Transmit Power Amplifier |
| Antenna System Controller | ASC | TMA: Tower Mounted Amplifier |
| External Alarm Unit | XALM | ALM: Alarm |
| | | OUT: Output |
| Fan Unit | FAN | FE: Fan Element |
| Capacitor Unit | CU | PD: Power Distributor |
| Power Control Unit | PCU | PS: Power Supply |
| | | BF: Battery Fuse |
| | | AC: AC Connector |
| | | CL: Climate |

Figure 8:
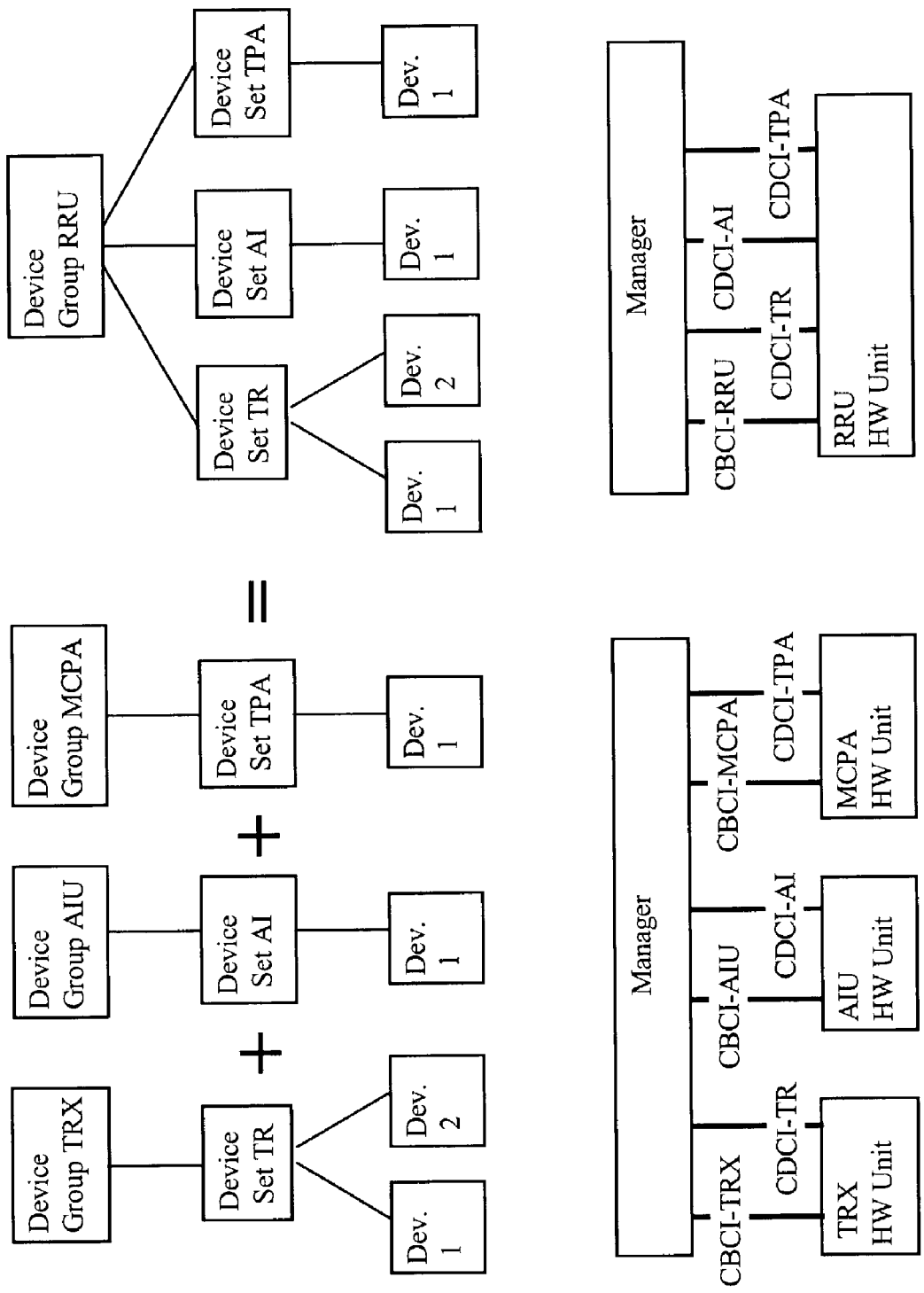
FIG. 8 illustrates a hardware unit integration example in the context of a base station in which the present invention is employed.

In this example, each device group has a Central Board Control Interface (CBCI). Each device set and its devices have a Central Device Control Interface (CDCI). Specific extensions of these interfaces are shown at the bottom of FIG. 8 between the manager and each of the hardware units. There are CBCI-TRX and CDCI-TR interfaces between the manager and the TRX hardware unit. CBCI-AIU and CDCI-AI interfaces are employed between the manager and the AIU hardware unit. CBCI-MCPA and CDCI-TPA interfaces are employed between the manager and the MCPA hardware unit. A CBCI interface may specify procedures for various functions such as loading, board test, subscriptions, board faults, board resets, etc. A CDCI interface on a CDCI device set level may specify procedures for various functions such as set test, subscriptions, set faults, set resets, capacity information, capability information, etc. A CDCI interface on a CDCI device level may specify procedures for various functions such as setup, release, capability information, device faults, etc.

For each specific device group, there is a specific CBCI extension that inherits the procedures from the CBCI and contains the specific extensions for that device group. For each specific device set and device, there is a CDCI extension that inherits the procedures from the CDCI and contains the specific extensions for that device set and device.

FIG. 8 illustrates a specific hardware unit reconfiguration and integration example applied to a macro base station apparatus being changed to include a remote radio unit. A conventional macro base station is generally located in a single location, and the distance between the baseband circuitry and the radio circuitry is relatively short, e.g., on the order of one meter. In a distributed, main-remote base station design, the baseband part and the radio part of the base station are split. The main unit (MU) performs base band signal processing, and one or more radio remote units (RRUs) converts between baseband and radio frequencies and transmits and receives signals over one or more antennas. Each RRU serves a certain geographic area or cell. An optical link connects the main unit to plural radio remote units.

In this example reconfiguration and integration, three different hardware units corresponding to a Transceiver (TRX) hardware unit, an Antenna Interface Unit (AIU) hardware unit, and a Multi-Carrier Power Amplifier (MCPA) hardware unit have corresponding device groups. Each of these hardware units, formerly positioned at the macro base station, now is to be integrated into a single remote hardware unit coupled to the main base station by an optical link. A new device group Remote Radio Unit (RRU) is created, which contains all of the device sets from the three device groups TRX, AIU, and MCPA.

After the integration, the new RRU device group has a new CBCI interface between the manager and the new RRU hardware unit. However, the device sets and their devices employ the same CDCI interfaces as used before for the three separate hardware units. The manager needs to make only a relatively small change to support the new CBCI-RRUs interface.

Figure 9:
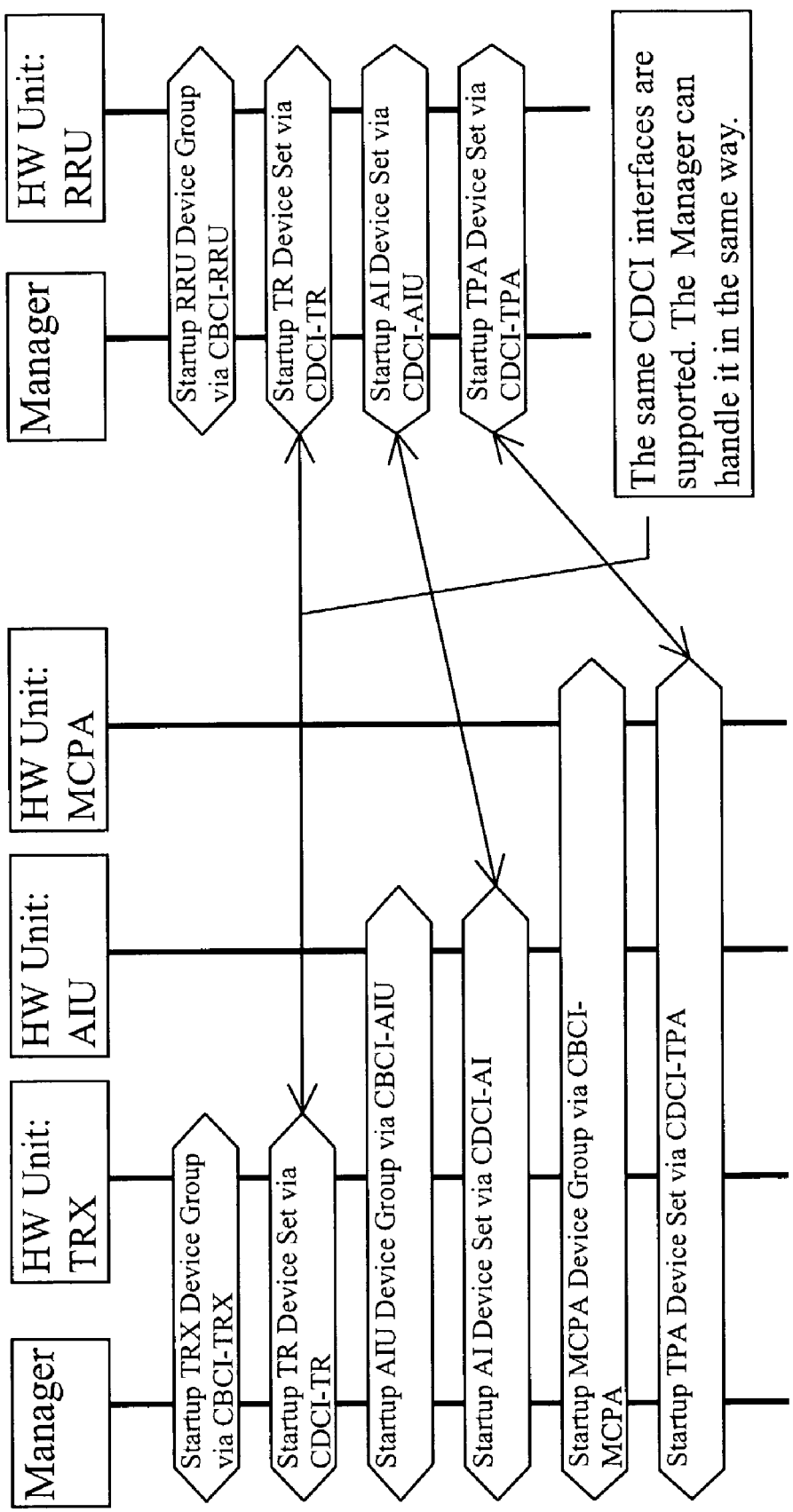
FIG. 9 illustrates example software architecture interface signaling between the software manager and certain hardware units in the base station for the example shown in FIG. 8.

FIG. 9 illustrates example procedures showing how the manager 40 controls the three hardware units TRX, AIU, and MCPA illustrated in FIG. 8 before integration. Each hardware unit is started first on a device group level using CBCI procedures. After starting a hardware unit on the device group level, the manager starts the associated device set using the procedures on the CDCI level. This is done for all three hardware units as shown in FIG. 9.

After the functions of the three hardware units have been integrated into one RRU hardware unit, the manager operates on the RRU hardware unit in substantially the same way despite the fact that RRU unit is physically remote from the main base station unit. The RRU device group is started, and thereafter, all three device sets are started. The same CDCI interface extensions are used; it does not make a difference to the manager that the device group has changed with respect the CDCI interface level. The manager simply needs to know the specific device sets that exist below the new RRU device group. Those device sets are already identified in the software architecture.

The following gives an overview of an example CBCI interface and examples of specific extensions. The CDCI interface may have a similar list of procedures. Unless otherwise indicated, the manager initiates each procedure.

| CBCI Procedures | Description |
| --- | --- |
| CONN_ESTABLISH | Establish connection and negotiate interface version to communicate with the HW Unit |
| START_UP_TEST | Execute startup test on the HW Unit |
| SELF_TEST | Execute self test on the HW Unit |
| AUDIT | Request the current state of the HW Unit. This determines the way the Manager will start-up the board |
| WARM_RESTART | Perform a restart of the HW Unit without having to reload it. |
| ENABLE_OPERATION | Put the HW Unit in the operational state. It is now ready to be used. |
| DISABLE_OPERATION | Put the HW Unit in a disabled state. It shall shutdown as much as possible to save power and prohibit interference with other boards. |
| SUBSCRIBE_FAULTS | Subscribe on Faults. The HW Unit shall inform the Manager about outstanding Faults |
| UNSUBSCRIBE_FAULTS | Cancel the subscription on Faults |
| FAULT | Used by HW Unit to inform Manager about detected Fault |
| VISUAL_INDICATION | Set the LED's on the HW Unit to a certain state. |
| GET_BOARD_INFO | Retrieve specific HW Unit characteristics. |
| GET_RUNNING_DP_LM | Get the name of the program running on the HW specific processors |
| SW_PRODUCT_INV | Retrieve the programs that are stored in the flash memory on the HW Unit |
| LOAD_DP | Load a program on the HW specific processors |
| LOAD_FLASH | Load a program to the flash memory on the HW Unit |
| MAX_LM_SIZE | Retrieve the available space on the flash memory |
| DELETE_LM | Delete a program from the flash memory on the HW Unit |
| BB_CLOCK_SV_FAULT | HW Unit informs Manager about fault with clock input |
| BB_CLOCK_SV_FAULTCEASE | HW Unit informs Manager that fault with clock input is gone |
| TEMP_SV_FAULT | HW Unit informs Manager about fault with board temperature |
| TEMP_SV_FAULTCEASE | HW Unit informs Manager that fault with board temperature is gone |

Besides these common procedures, a CBCI-X can contain procedures that are only applicable for that specific Device Group X. This can be any kind of procedure but will likely be only configuration of specific parameters, e.g., CONFIG_PARAM_X or CONFIG_MODE_Y.

Using the software architecture in accordance with the present invention, it is relatively easy then to expand the capacity of a hardware unit. Capacity can be extended by increasing the number of devices supported in a device set. If a device uses processing capacity from a shared pool of processing resources, the processing capacity of the pool can be extended. Consider this example. A first generation of receiver boards supports 16 devices in its device set. The next generation of receiver boards supports 96 devices in its device set. Future generations may support even more. Both generations of the receiver board may be employed in the same configuration. To accomplish this, the manager simply requests the device set associated with the hardware unit to provide the number of devices it supports.

For a small base station, it may make sense to integrate a number of hardware units into a single hardware unit. This results in a new device group with a number of device sets. If the required capacity for such a small base station is lower than what is currently configured, the capacity is easily reconfigured simply by reducing the number of devices supported in the device set. Accordingly, reduced capacity and fewer devices can be supported with very limited impact on the manager.

It is also relatively easy to change the capability of the devices. Individual device level or set level capability information is simply provided to the manager which accounts for these enhanced capabilities. In the case of device level capabilities, the user of the device in the manager can request the capabilities from the device via the device interface architecture and use the device accordingly. In the case of device set level capabilities, the same approach may be followed, although these capabilities apply to all the devices in the device set. Here as well the manager retrieves the capability information from the device set and uses the device set and devices according to the supported capabilities.

Consider the example of a device that supports a specific algorithm. A new generation of boards can support a more advanced algorithm. In the situation where two boards are used—one of an old generation and one of a new generation—together in the same configuration and where it is required that the same algorithms are used, the manager retrieves for both devices the algorithms each device supports and selects the algorithm that both devices support.

Using the software architecture in accordance with the present invention, it is relatively easy to handle a partly malfunctioning hardware unit. If the hardware unit detects that one of the devices in a device set is malfunctioning, it may report a fault on the CDCI interface for that device. Based on that report, the manager can take appropriate action for recovery. Faults can be handled on each level in the software architecture in the same way. Faults on a certain level effect only that level and levels below. For example, faults on a device level affect only one device instance. Faults on a device set level affect all devices within that device set. Faults on a device group level affect the whole hardware unit. Device set and device data structures not affected by the fault can still be used.

While the present invention has been described with respect to particular embodiments, those skilled in the art will recognize that the present invention is not limited to these specific example embodiments. Different formats, embodiments, and adaptations besides those shown and described as well as many variations, modifications, and equivalent arrangements may also be used to implement the invention. Accordingly, the invention is limited only by the scope of the claims appended hereto.

What is claimed is:

1. A computer-implemented method for controlling an apparatus including one or more hardware units each for performing one or more corresponding functions, comprising:

establishing a software architecture for controlling the apparatus;

generating a device group data structure in the software architecture for each hardware unit;

generating a device data structure in the software architecture associated with each instance of hardware unit function, wherein each device group data structure includes device data structures of a certain type in one hardware unit, and wherein each device data structure represents a function of one or more inputs resulting in a well-defined output or outputs;

mapping each device data structure to a hardware unit responsible for actually implementing the device's function:

generating one or more device set data structures in the software architecture, each device set data structure being associated with one or more device groups and including one or more device data structures;

establishing a software manager for managing the one or more hardware units using the device group, device set, and device data structures in the software architecture, defining a device group software interface for each device group data structure and a device set software interface for each device set and device data structure;

wherein the software interfaces define how the software manager communicates with and manages the one or more hardware units using the software architecture; and using the data structures in the software architecture to control functionality for the apparatus performed by the one or more hardware units.

2. The method in claim 1, wherein the mapping is performed by the hardware unit.

3. The method in claim 1, wherein the device data structure is independent from the hardware unit responsible for actually implementing the device's function.

4. The method in claim 1, wherein an identity, configuration, or implementation of a hardware unit is changed without having to change the associated device data structure.

5. The method in claim 1, wherein each device set data structure includes device data structures of a certain type in one hardware unit.

6. The method in claim 1, wherein device data structures in each device set data structure have a common characteristic, function, or configuration.

7. The method in claim 1, wherein each device group data structure is used to bring each device set data structure associated with that device group data structure into service and coordinate each device set data structure with the device group data structure.

8. The method in claim 1, wherein if a hardware unit is changed to support a different function, the hardware unit is associated with a new device group data structure.

9. The method in claim 1, further comprising:

integrating functionality implemented by plural ones of the hardware units into a new hardware unit by defining a new device group data structure for the new hardware unit that includes the device set data structures associated with the plural hardware units.

10. The method in claim 9, further comprising:

defining a new device group software interface, wherein the device set software interfaces already defined for the device set data structures associated with the plural hardware units are employed in the new device group data structure.

11. The method in claim 1, wherein each device group data structure is used to bring each device data structure associated with that device group data structure into service.

12. The method in claim 1, wherein the apparatus is a radio base station and the manager uses the software architecture to expand the capacity of one or more of the hardware units by increasing a number of device data structures associated with the corresponding device set or device group data structure.

13. The method in claim 1, wherein the apparatus is a radio base station and the manager uses the software architecture to enhance a capability associated with one or more device data structures or device set data structures.

14. A software architecture implemented in a computer for controlling an apparatus including one or more hardware units each for performing one or more corresponding functions, comprising:

a software device group for each hardware unit;

a software device for each hardware unit function instance, wherein each device data structure is mapped to a hardware unit responsible for actually implementing the device's function;

wherein each software device group includes software devices of a certain type associated with a hardware unit, and wherein each software device represents a function of one or more inputs resulting in a well-defined output or outputs;

one or more software device sets, each software device set being associated with a software device group and including one or more software devices in the software device set; and a software manager for controlling functionality for the apparatus performed by the one or more hardware units using the software device group, software device set, and software device in the software architecture and for defining a software device group software interface for each software device group and a device set software interface for each software device set and device, wherein the software interfaces are configured to define how the software manager is to communicate and manage the one or more hardware units using the software architecture.

15. The software architecture in claim 14, wherein each hardware unit is configured to associate itself with one or more software device functions.

16. The software architecture in claim 14, wherein the device is independent from the hardware unit responsible for actually implementing the device's software function.

17. The software architecture in claim 14, wherein an identity, configuration, or implementation of a hardware unit may be changed without having to change the associated software device.

18. The software architecture in claim 14, wherein each software device set includes devices of a certain type associated with a hardware unit.

19. The software architecture in claim 14, wherein software devices in each software device set have a common characteristic, function, or configuration.

20. The software architecture in claim 14, wherein each software device group is configured to bring each software device set associated with that software device group into service and coordinate each software device set with the software device group.

21. The software architecture in claim 14, wherein if a hardware unit is changed to support a different function, the hardware unit is associated with a new software device group.

22. The software architecture in claim 14, wherein each software device group is configured to bring each software device associated with that software device group into service.

23. The software architecture in claim 14, wherein the software manager is configured to define a new software device group for a new hardware unit that includes the software devices sets associated with plural hardware units in order to integrate functionality implemented by the plural hardware units into a new hardware unit.

24. The software architecture in claim 23, further comprising:
a new device group software interface,
wherein the device set software interfaces already defined for the software devices sets associated with the plural hardware units may be employed in the new software device group.

25. The software architecture in claim 14, wherein the apparatus is radio base station and the software manager is configured to use the software architecture to expand a capacity of one or more of the hardware units by increasing a number of software devices associated with the corresponding software device group or device set.

26. The software architecture in claim 14, wherein the apparatus is a radio base station and the manager is configured to use the software architecture to enhance a capability of the one or more software devices.

27. The software architecture in claim 14, wherein the software manager is configured to use the software architecture to recover from a fault detected in a hardware unit.

28. The method in claim 1, wherein the apparatus is a radio base station initially configured as a macro base station located in a single location and the method of claim 1 is used to reconfigure the macro base station into a distributed, main-remote base station having a baseband part and a radio part located in different locations.

29. The method in claim 28, wherein the macro base station includes multiple device group data structures associated with different base station hardware units to be integrated into the radio part, the method further comprising:
establishing a new device group data structure which contains all device set data structures from the multiple device group data structures.

30. The method in claim 29, further comprising:
establishing a new interface between the software manager and the new device group data structure.

31. The software architecture in claim 14, wherein the apparatus is a radio base station initially configured as a macro base station located in a single location and wherein the software manager is configured to reconfigure the macro base station into a distributed, main-remote base station having a baseband part and a radio part located in different locations.

32. The software architecture in claim 31, wherein the macro base station includes multiple device group data structures associated with different base station hardware units to be integrated into the radio part, and wherein the software manager is configured to establish a new device group data structure which contains all device set data structures from the multiple device group data structures.

33. The software architecture in claim 32, wherein the software manager is configured to establish a new interface between the software manager and the new device group data structure.

* * * * *